(12) United States Patent
Ishikawa (10) Patent No.: US 10,048,675 B2
(45) Date of Patent: Aug. 14, 2018

(54) NUMERICAL CONTROLLER PERFORMING 3-DIMENSIONAL INTERFERENCE CHECK CORRESPONDING TO FEEDRATE CHANGE

(71) Applicant: FANUC Corporation, Yamanashi (JP)

(72) Inventor: Yasuhito Ishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 237 days.

(21) Appl. No.: 15/196,078

(22) Filed: Jun. 29, 2016

(65) Prior Publication Data
US 2017/0003672 A1 Jan. 5, 2017

(30) Foreign Application Priority Data
Jun. 30, 2015 (JP) .................................. 2015-130906

(51) Int. Cl.
*G06F 19/00* (2018.01)
*G05B 19/4061* (2006.01)

(52) U.S. Cl.
CPC .................. *G05B 19/4061* (2013.01); *G05B 2219/49153* (2013.01)

(58) Field of Classification Search
CPC ........ B23Q 15/00; B23Q 15/28; G05B 19/28; G05B 19/42
See application file for complete search history.

(56) References Cited

U.S. PATENT DOCUMENTS

| | | | | |
|---|---|---|---|---|
| 8,140,177 B2* | 3/2012 | Ide | ..................... | G05B 19/4061 700/177 |
| 8,374,718 B2* | 2/2013 | Takahashi | .......... | G05B 19/4069 318/568.15 |
| 2005/0283270 A1* | 12/2005 | Nakamura | ......... | G05B 19/4069 700/178 |
| 2008/0024083 A1* | 1/2008 | Yamaguchi | ........ | G05B 19/4061 318/569 |
| 2010/0087948 A1* | 4/2010 | Yamaguchi | ........ | G05B 19/4061 700/178 |

(Continued)

FOREIGN PATENT DOCUMENTS

JP 2008027376 A 2/2008
JP 2010-244256 A 10/2010

(Continued)

OTHER PUBLICATIONS

Office Action in JP Application No. 2015-130906, dated Aug. 22, 2017, 6 pages.

*Primary Examiner* — Vincent Tran
(74) *Attorney, Agent, or Firm* — Hauptman Ham, LLP (57) ABSTRACT

An object of the present invention is to provide a numerical controller that performs interference check based on a look-ahead position before a feedrate varies by taking the variation in the feedrate into consideration and controls the change of an override safely. To achieve this object, the numerical controller is configured such that, when calculating a coordinate value of a look-ahead position which a movable part subjected to interference check reaches after a look-ahead period elapses from a current position at a current time, the numerical controller calculates the look-ahead position assuming that the movable part moves at a predetermined feedrate of which the upper limit is the maximum feedrate.

3 Claims, 11 Drawing Sheets

(56) References Cited

U.S. PATENT DOCUMENTS

2011/0035044 A1     2/2011   Takahashi et al.
2016/0195870 A1*   7/2016   Nagano .............. G05B 19/4061
                                                                   700/178

FOREIGN PATENT DOCUMENTS

JP          2012-58976 A     3/2012
WO       2009/130759 A1   10/2009

* cited by examiner

FIG.2

● : CURRENT POSITION
○ : LOOK-AHEAD POSITION

FIG.7

● : CURRENT POSITION
○ : LOOK-AHEAD POSITION
◌ : LOOK-AHEAD POSITION AT WHICH INTERFERENCE CHECK HAS BEEN COMPLETED
$P_C(T_n)$ : CURRENT POSITION AT TIME Tn
$P_P(T_n)$ : LOOK-AHEAD POSITION AT TIME Tn
$P'_P(T_n)$ : $P_P(T_n)$ ON WHICH INTERFERENCE CHECK HAS BEEN COMPLETED

● : CURRENT POSITION
○ : LOOK-AHEAD POSITION
◌ : LOOK-AHEAD POSITION AT WHICH INTERFERENCE CHECK HAS BEEN COMPLETED $P_{NC}(Tn)$ : CURRENT POSITION AT TIME Tn OF PATH N
$P_{NP}(Tn)$ : LOOK-AHEAD POSITION AT TIME Tn OF PATH N
$P'_{NP}(Tn)$ : $P_{NP}(Tn)$ OF PATH N ON WHICH INTERFERENCE CHECK HAS BEEN COMPLETED

NUMERICAL CONTROLLER PERFORMING 3-DIMENSIONAL INTERFERENCE CHECK CORRESPONDING TO FEEDRATE CHANGE

RELATED APPLICATIONS

The present application claims priority to Japanese Patent Application Number 2015-130906, filed Jun. 30, 2015, the disclosure of which is hereby incorporated by reference herein in its entirety.

BACKGROUND OF THE INVENTION

1. Field of the Invention

The present invention relates to a numerical controller that performs 3-dimensional interference check in relation to a variation in the feedrate so that collisions can be avoided properly.

2. Description of the Related Art

As an example of a numerical controller that drives and controls a movable part of a machine based on a command of a program, Japanese Patent Application Laid-Open No. 2008-27376 discloses a numerical controller which includes an interference checking unit that calculates the position (hereinafter referred to as a look-ahead position) of a movable part, a predetermined period after the current time, calculated based on a programmed speed and a programmed speed override value and checks an interference between the movable part and another object based on the look-ahead position and in which the movement of the movable part is decelerated and stopped when an interference is predicted by the interference checking unit.

When the technique disclosed in Japanese Patent Application Laid-Open No. 2008-27376 is to be used, a period (hereinafter referred to as a "look-ahead period") from the current position to the look-ahead position, calculated by the numerical controller to allow the interference checking unit to predict an interference to safely decelerate and stop the movement of the movable part is set to a period that is not less than a value ($=T_{P1}+T_{P2}+T_{P3}+\alpha$) in which $T_{P1}$ is the time required for the interference check, $T_{P2}$ is the time required for communication between the interference checking unit and the main body of the numerical controller, $T_{P3}$ is the time elapsed until the moving movable part is decelerated and stopped, and $\alpha$ is the time allowance.

The look-ahead period is a period in which the movable part can be safely stopped when the current feedrate is used as a reference. Thus, if the feedrate (override value) is changed by an operator, the interference may have already occurred when it is predicted by the interference check that the interference occurs. Thus, there is a problem that it is not possible to safely stop the movable part until a predetermined period elapses (from the time at which the feedrate is changed until interference check is completed based on the look-ahead position after the feedrate changes) even when it is predicted that the interference occurs.

Figure 7:
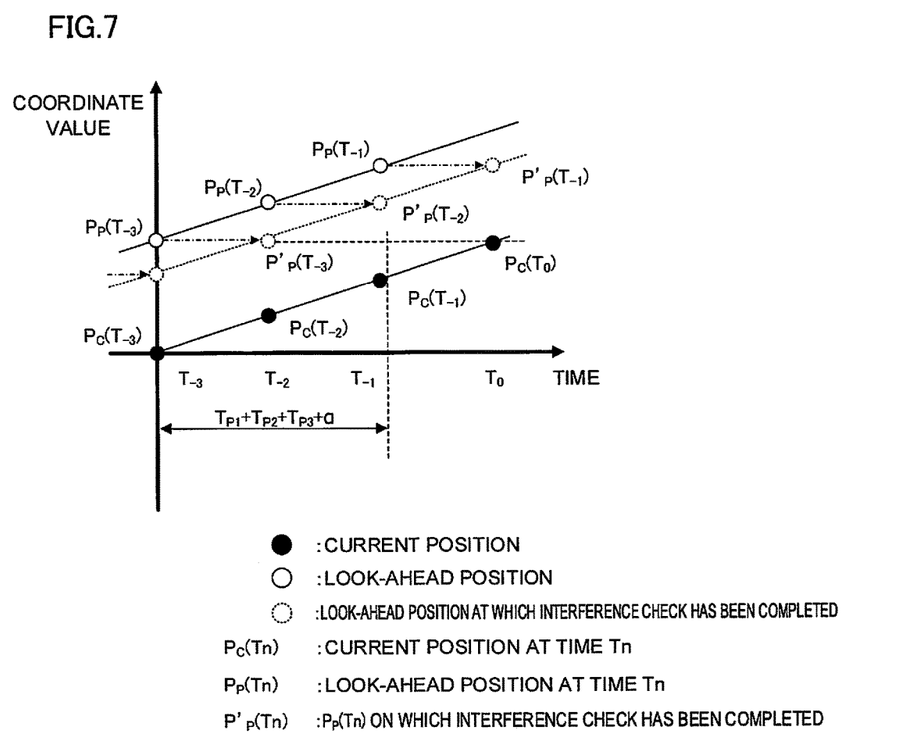
FIG. 7 illustrates a conventional interference check process.

FIG. 7 is a graph illustrating the relation between a current position of a movable part at time $T_n$ and a look-ahead position used in interference check when controlling a single-path machine.

As illustrated in FIG. 7, when interference check at a look-ahead position $P_P(T_n)$ at a look-ahead period which is not less than $T_{P1}+T_{P2}+T_{P3}+\alpha$ at each time $T_n$ is completed at $T_{n+1}$, it is possible to stop the movement of the movable part safely in principle even after the occurrence of the interference is detected, so long as a coordinate value of a current position does not surpass a coordinate value $P'_P(T_{n-1})$ of a look-ahead position at which interference check has already been completed.

Figure 8:
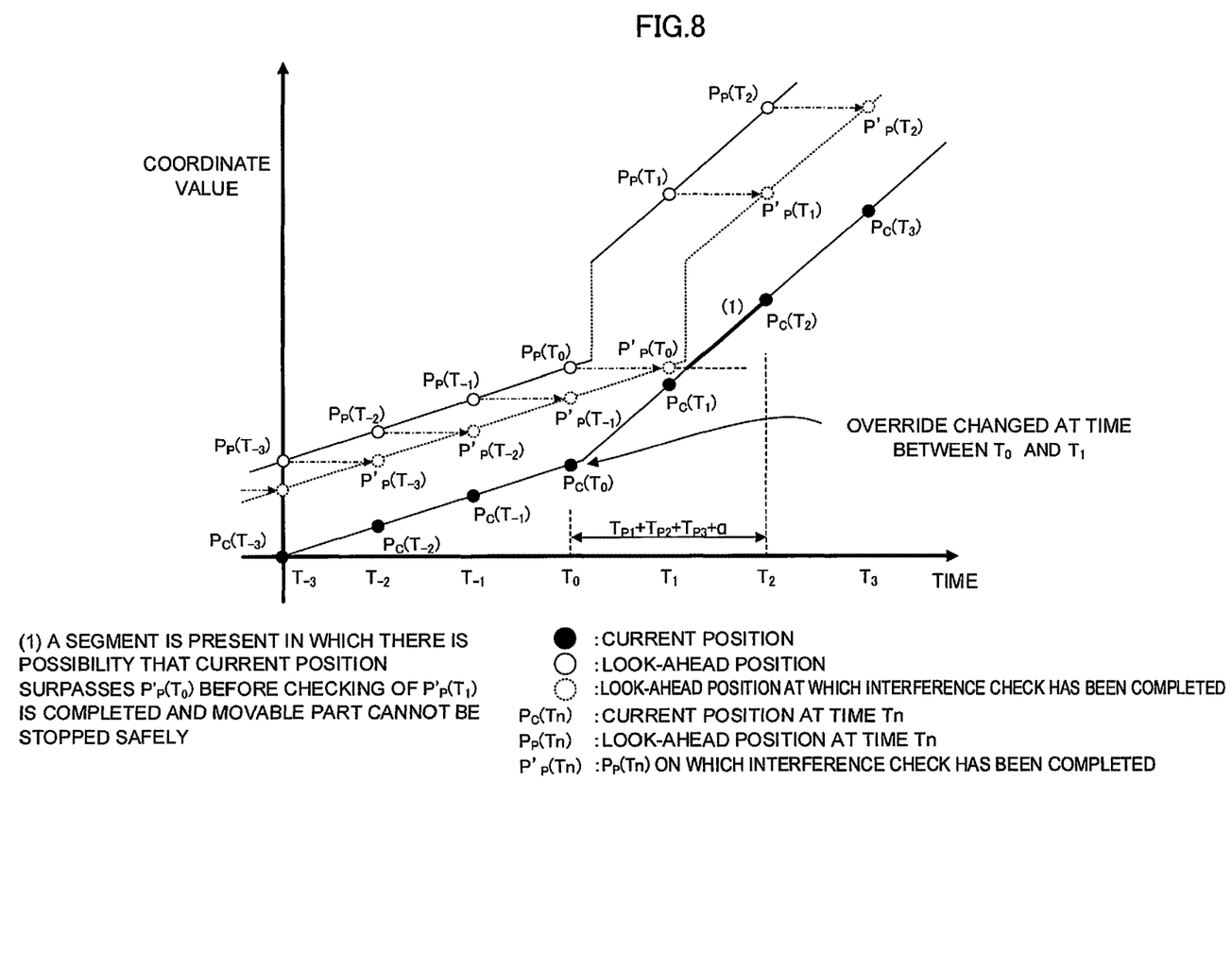
FIG. 8 illustrates a problem of the conventional interference check process when an override is changed.

FIG. 8 is a graph illustrating the relation between a current position of a movable part at time $T_n$ and a look-ahead position used in interference check when an override is changed when controlling a single-path machine.

As illustrated in FIG. 8, when an override is changed at the time between $T_0$ and $T_1$, since a coordinate value of a current position surpasses a coordinate value of a look-ahead position at which interference check has already been completed as in portion (1) indicated by a bold line in the drawing, the interference check is not completed in the portion indicated by the bold line. Thus, there is a possibility that the movable part cannot be stopped safely.

FIGS. 9A to 11 illustrate an example in which an override is changed when controlling a multi-path machine.

Figure 9A:
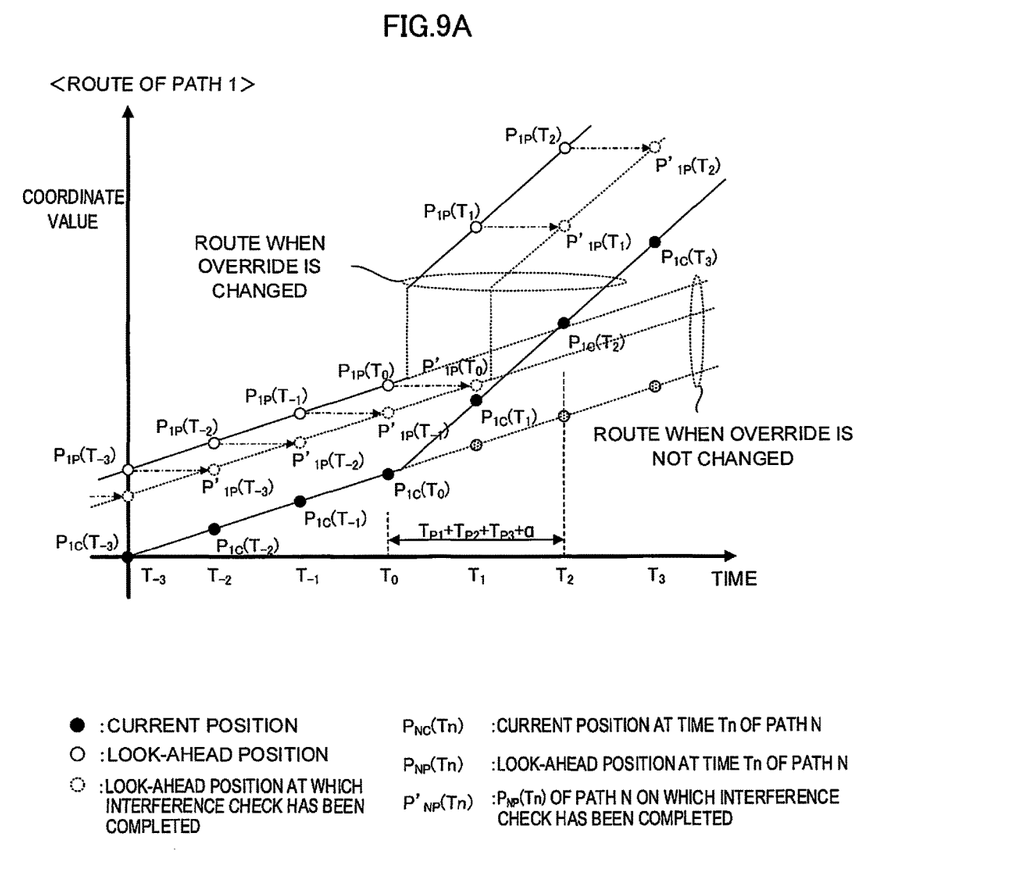
FIGS. 9A to 9B illustrate the routes of movable parts of each path during multi-path control.
Figure 9B:
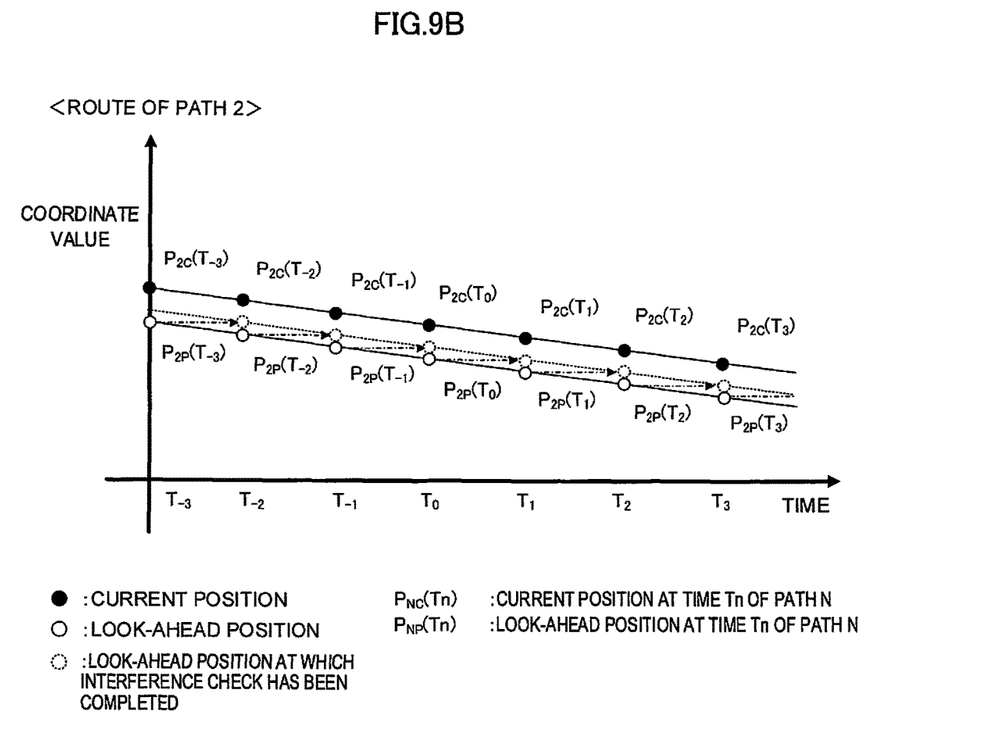
Figure 10:
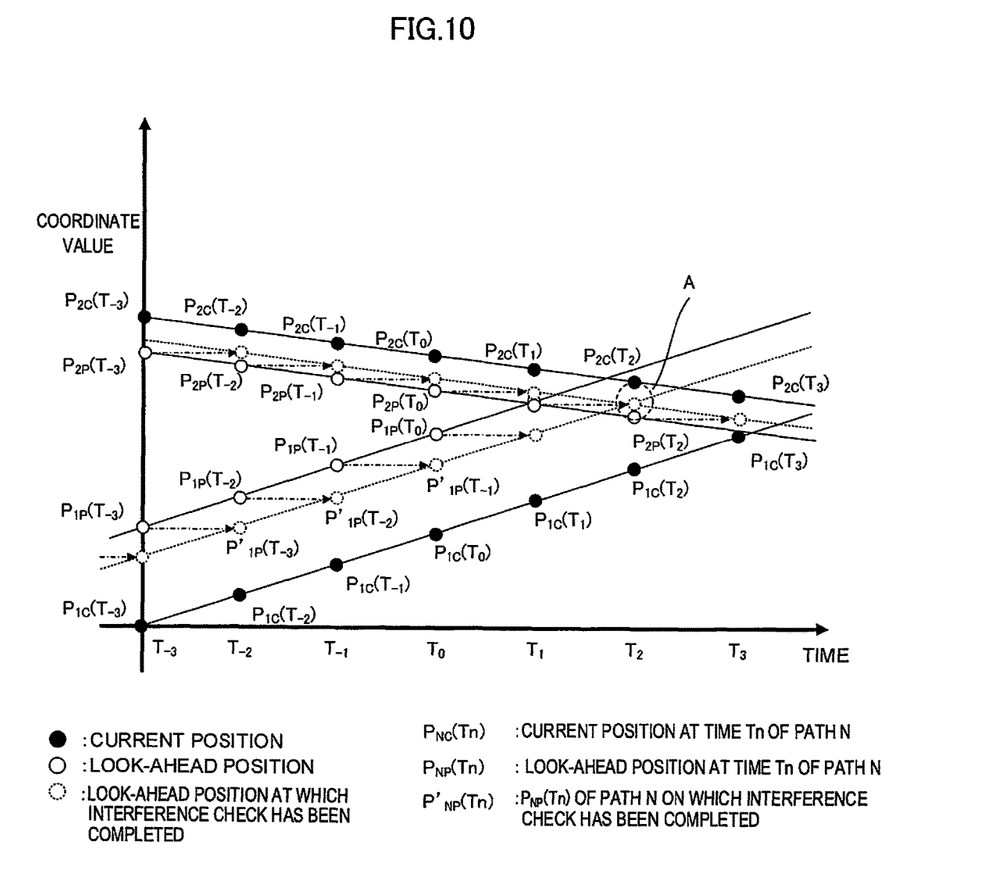
FIG. 10 illustrates the conventional interference check process during multi-path control.
Figure 11:
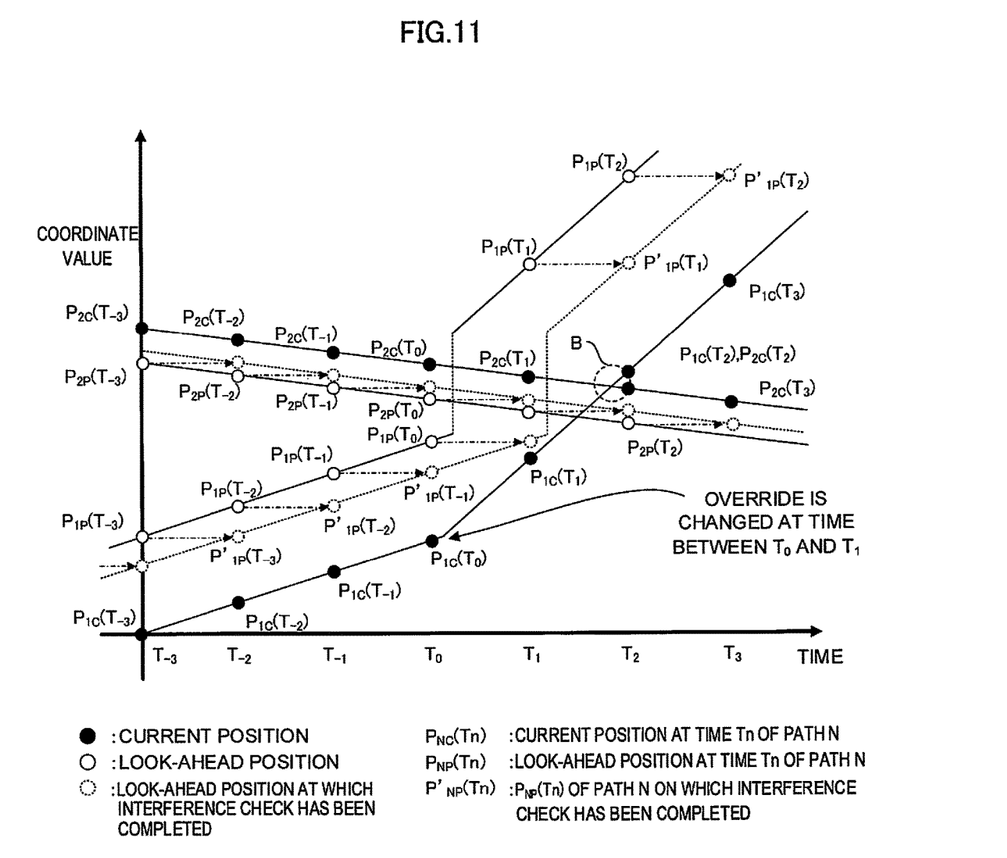
FIG. 11 illustrates a problem of the conventional interference check process when an override is changed during multi-path control.

When movable parts are operated without changing an override when controlling Path 1 illustrated in FIG. 9A and Path 2 illustrated in FIG. 9B, it is determined (interference check is completed) at time $T_2$ (indicated by A in FIG. 10) that a look-ahead position of Path 1 and a look-ahead position of Path 2, which are subjected to interference check at time $T_1$ interfere with each other as illustrated in FIG. 10. Thus, it is possible to safely stop the respective movable parts before the coordinate values of current positions of respective paths reach coordinate values at which the interference occurs. However, when an override of Path 1 is changed at time between $T_0$ and $T_1$, as shown in FIG. 11, the coordinate values of the current positions of the respective paths cross each other at the position indicated by B in FIG. 11 before interference check based on the look-ahead position of Path 1 and the look-ahead position of Path 2 at time $T_1$ is completed. Thus, there is a possibility that the movable parts cannot be stopped safely.

SUMMARY OF THE INVENTION

Therefore, it is an object of the present invention to provide a numerical controller capable of preventing a collision properly in relation to a variation in the feedrate.

A numerical controller of the present invention solves the above-described problem by performing interference check based on a look-ahead position before a feedrate varies by taking the variation in the feedrate into consideration and controls the change of an override safely because the interference check cannot be performed safely when the look-ahead position is calculated again after the feedrate is changed.

A numerical controller of the present invention controls driving of a movable part of a machine based on a command from a program and includes an interference checking unit that checks an interference between the movable part and another object, the numerical controller being configured to decelerate and stop movement of the movable part when an interference is predicted by the interference checking unit. The numerical controller includes: a feedrate override commanding unit configured to command an override value of a feedrate of the movable part; a command analysis unit configured to look ahead and analyze a program to generate look-ahead block command data; and a route calculating unit configured to calculate a surplus look-ahead period which is a period obtained by adding a surplus period to a look-ahead period which is a period required for the interference checking unit to predict an interference to safely decelerate and stop the movement of the movable part, calculate, based on the look-ahead block command data, at least one surplus look-ahead position of the movable part after the surplus look-ahead period elapses, the surplus look-ahead period corresponding to at least one set override value including at least an approximately maximum override value commandable by the feedrate override commanding unit, and output a plurality of surplus look-ahead positions to the interference checking unit. The interference checking unit performs interference check based on the plurality of surplus look-ahead positions.

The route calculating unit may be configured to output a command route commanded by the look-ahead block command data to the interference checking unit as well as the plurality of surplus look-ahead positions, and the interference checking unit may be configured to perform interference check based on the plurality of surplus look-ahead positions and the command route.

The numerical controller may further include a feedrate override changing unit that limits the change of an override value according to a command from the interference checking unit, and the interference checking unit may be configured to perform interference check based on the surplus look-ahead positions and cause the feedrate override changing unit to limit the change of the override value when an interference is detected as the result of the interference check.

According to the present invention, even when a feedrate varies, it is possible to safely control the feedrate so that a machine does not interfere with another object.

BRIEF DESCRIPTION OF THE DRAWINGS

The above and other objects and features of the present invention will be apparent from the following description of an embodiment with reference to the appended drawings, in which.

DETAILED DESCRIPTION OF THE PREFERRED EMBODIMENTS

When a coordinate value of a look-ahead position that a movable part subjected to interference check reaches after a look-ahead period elapses from a current position at a current time is to be calculated, a numerical controller according to the present invention calculates the coordinate value of the look-ahead position assuming that the movable part moves at a predetermined feedrate (predetermined override value) of which the upper limit is the maximum feedrate (the feedrate when the override value is the largest).

Figure 1:
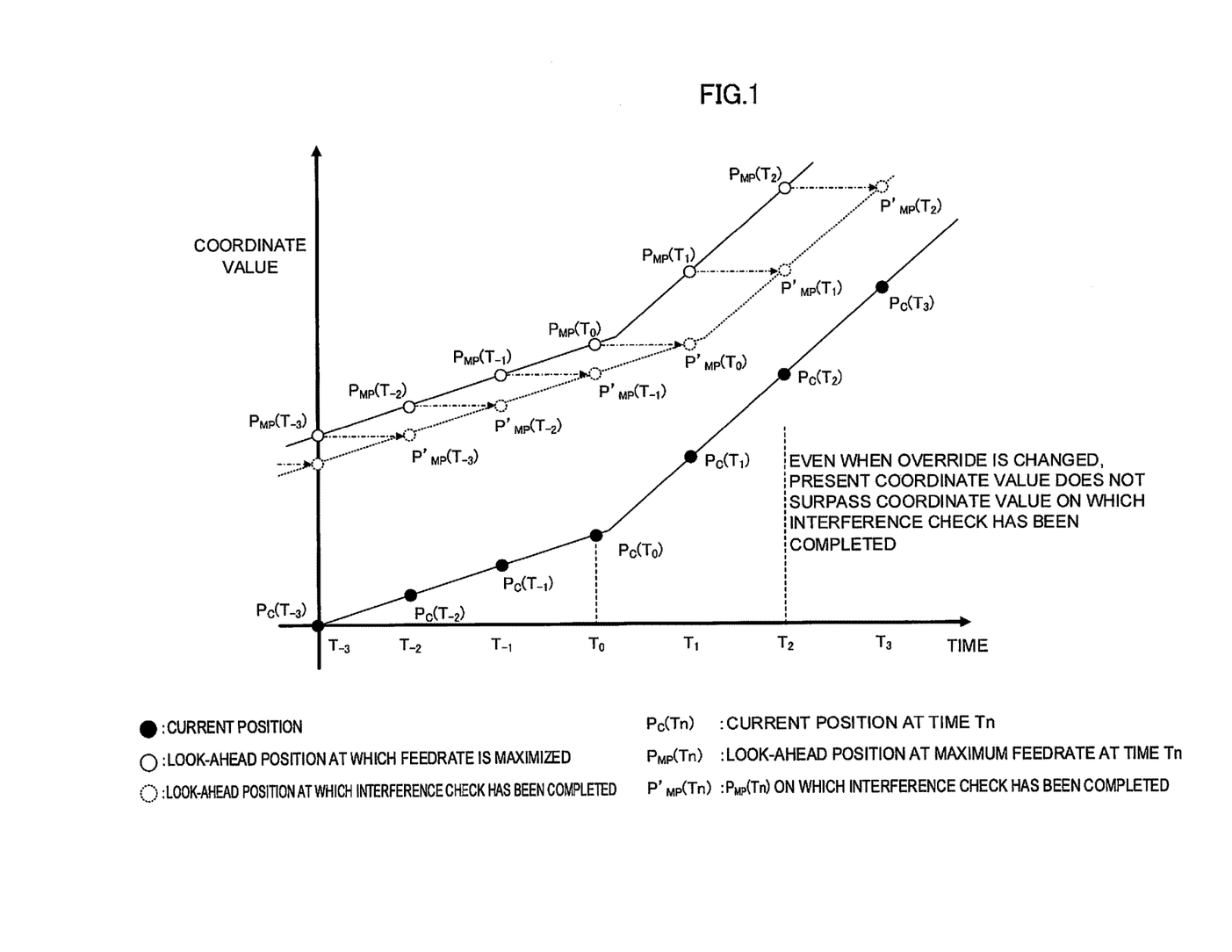
FIG. 1 illustrates an example in which a numerical controller according to the present invention calculates a coordinate value of a look-ahead position to perform interference check assuming that a movable part moves from a current position at a maximum feedrate.

FIG. 1 illustrates an example in which a numerical controller according to the present invention calculates a coordinate value of a look-ahead position to perform interference check assuming that a movable part moves from a current position at a maximum feedrate.

As illustrated in FIG. 1, when $P_c(T_n)$ is the current position at time $T_n$, $P_{MP}(T_n)$ is the look-ahead position after a look-ahead period elapses when the movable part moves from the current position $P_c(T_n)$ at the maximum feedrate, and $P'_{MP}(T_n)$ is the position at which interference check based on the look-ahead position $P_{MP}(T_n)$ ends, even if an operator increases the override value in the middle of the movement, the interference check at the coordinate value of the movable part moving based on the override value will be already completed.

Figure 2:
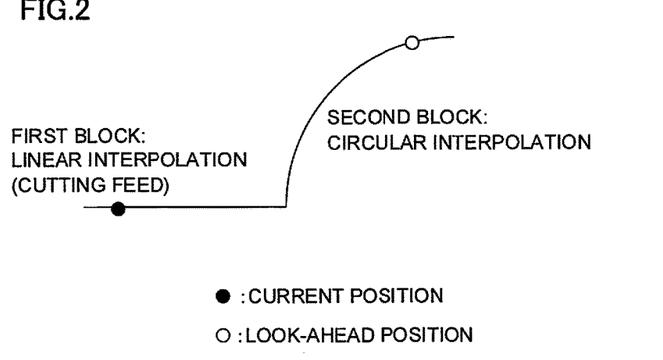
FIG. 2 illustrates route information output to an interference checking unit included in the numerical controller according to the present invention.

In this case, block information on a route from a current position to a look-ahead position at a predetermined feedrate of which the upper limit is the maximum federate may be output. Such block information may include, for example, as illustrated in FIG. 2, an end point of a first block at which the current position is located and information of a command based on a linear interpolation (cutting feed), and a center position of a circular arc of a second block, a look-ahead position and information of a command based on a circular interpolation command.

With such a function, high-accuracy interference check can be performed by taking the route from the current position to the look-ahead position into consideration.

Moreover, when a coordinate value of a look-ahead position is to be calculated based on predetermined override, a coordinate value of a position (hereinafter referred to as a surplus look-ahead position) of a movable axis at the time when a period obtained by adding a surplus period to a look-ahead period elapses is calculated, interference check is performed at the surplus look-ahead position. And if there is a possibility that an interference occurs in the route from the current position to the surplus look-ahead position, then the change of the override value of a corresponding path is limited or amended (hereinafter, such function is referred to as an "override limiting function"). With such a function, the change of the override value is limited or amended in the following manner.

(1) When an override value is increased, it is inhibited to change the override value to a predetermined override value at which the occurrence of the interference is detected by the interference check.

(2) When an override value is decreased, the override value of the corresponding path is decreased by the same proportion as the commanded value.

Figure 3:
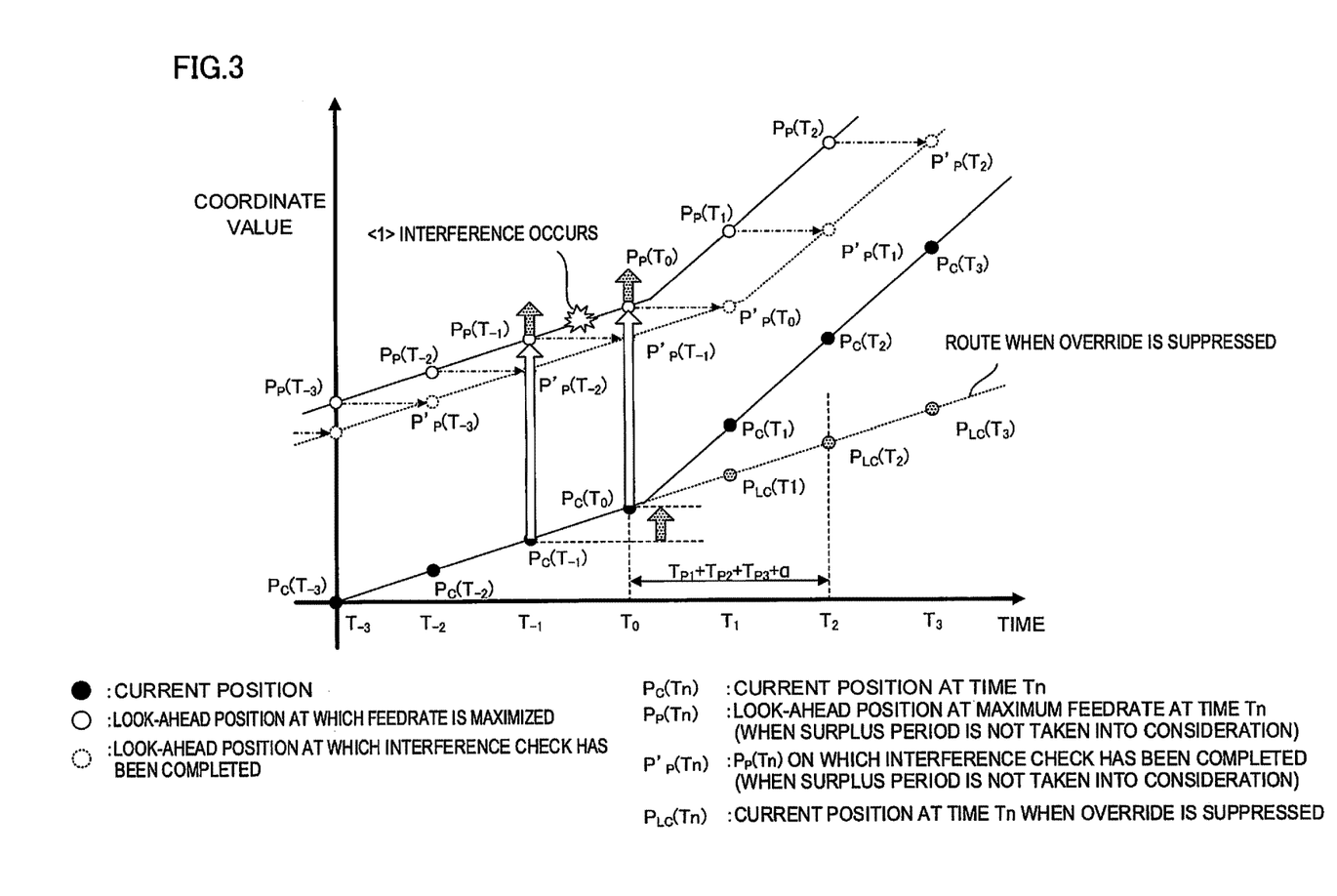
FIG. 3 illustrates an overview of an override limiting function of the numerical controller according to the present invention.

FIG. 3 illustrates an example in which the numerical controller according to the present invention calculates a coordinate value of a surplus look-ahead position which is the position at the time when a period obtained by adding a surplus period to a look-ahead period elapses when a movable part moves from the current position at the maximum feedrate and performs interference check.

In the numerical controller of the present invention, when an interfering object or the like is present at a coordinate position indicated by <1> in FIG. 3 during interference check, the change of an override at the time later than the completion time ($T_0$) of the interference check is suppressed. Thus, even when an operator increases the override value at the time between $T_0$ and $T_1$, the change of the override is suppressed, and the movable part follows the route of $P_{LC}$ ($T_1$), $P_{LC}$ ($T_2$), and $P_{LC}$ ($T_3$).

Figure 4:
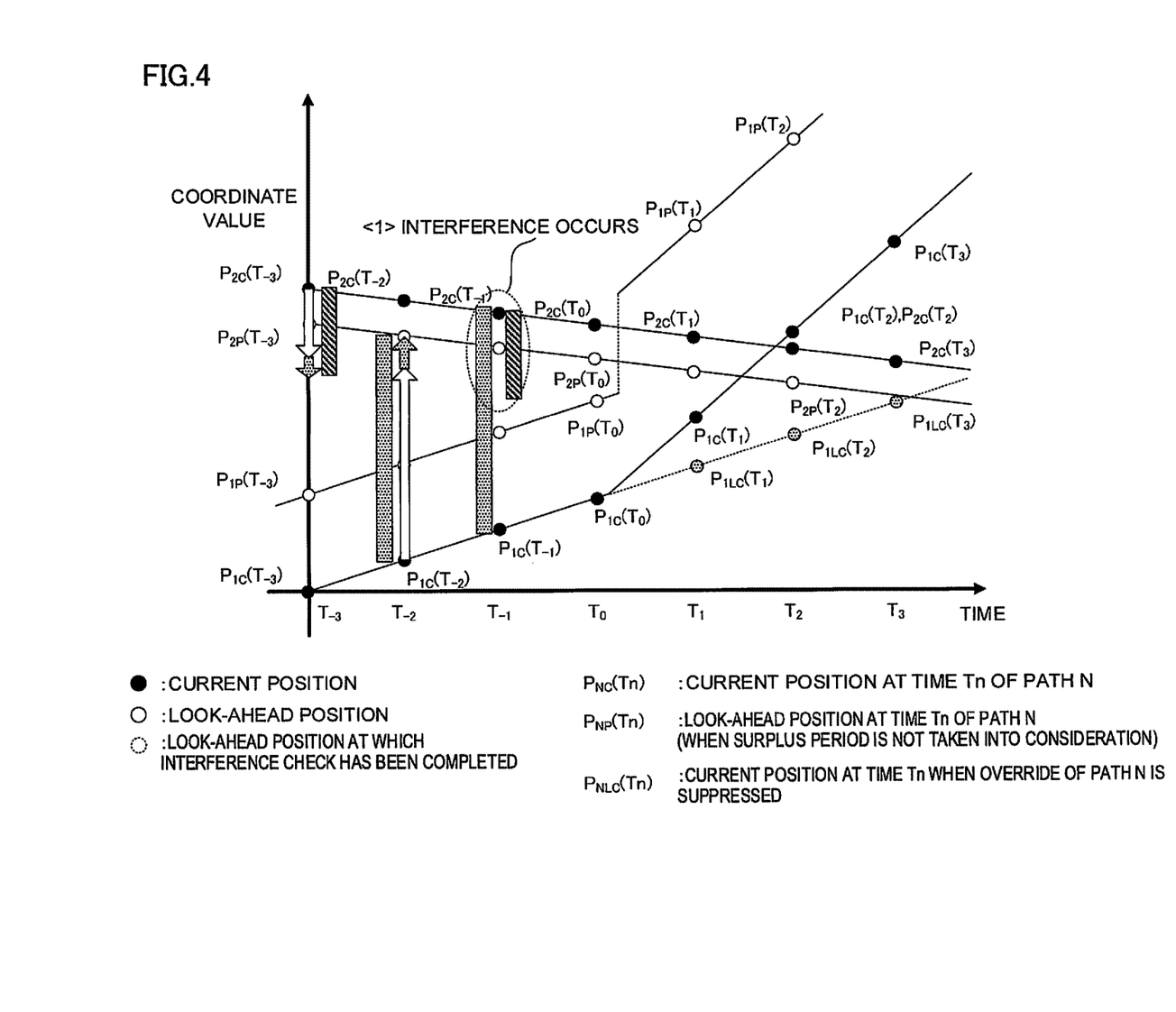
FIG. 4 illustrates an overview of an override limiting function for multi-path control of the numerical controller according to the present invention.

FIG. 4 illustrates an example in which the numerical controller calculates a coordinate value of a surplus look-ahead position which is the position at the time when a period obtained by adding a surplus period to a look-ahead period elapses when a movable part of each path moves from a current position at the maximum feedrate when controlling a multi-path machine and performs interference check.

Since there is a possibility that Path 1 interferes with Path 2 in the portion indicated by <1> in FIG. 4 during interference check, the numerical controller suppresses the change of an override at the time later than the completion time ($T_0$) of the interference check. Even when an operator increases the override value at the time between $T_0$ and $T_1$, the change of the override is suppressed and the movable part of Path 1 follows the route of $P_{1LC}(T_1)$, $P_{1LC}(T_2)$, and $P_{1LC}(T_3)$.

A period taken until the interference check is completed may be set as the surplus period as illustrated in FIGS. 3 and 4, for example, and a period of $T_{P1}+T_{P2}+T_{P3}$ may be set as the surplus period by taking a time required to stop the movement of the movable axis into consideration.

With such a function, since the change of the override is suppressed when there is a possibility of interferences, it is possible to safely stop the movable part in the event of interferences.

Figure 5:
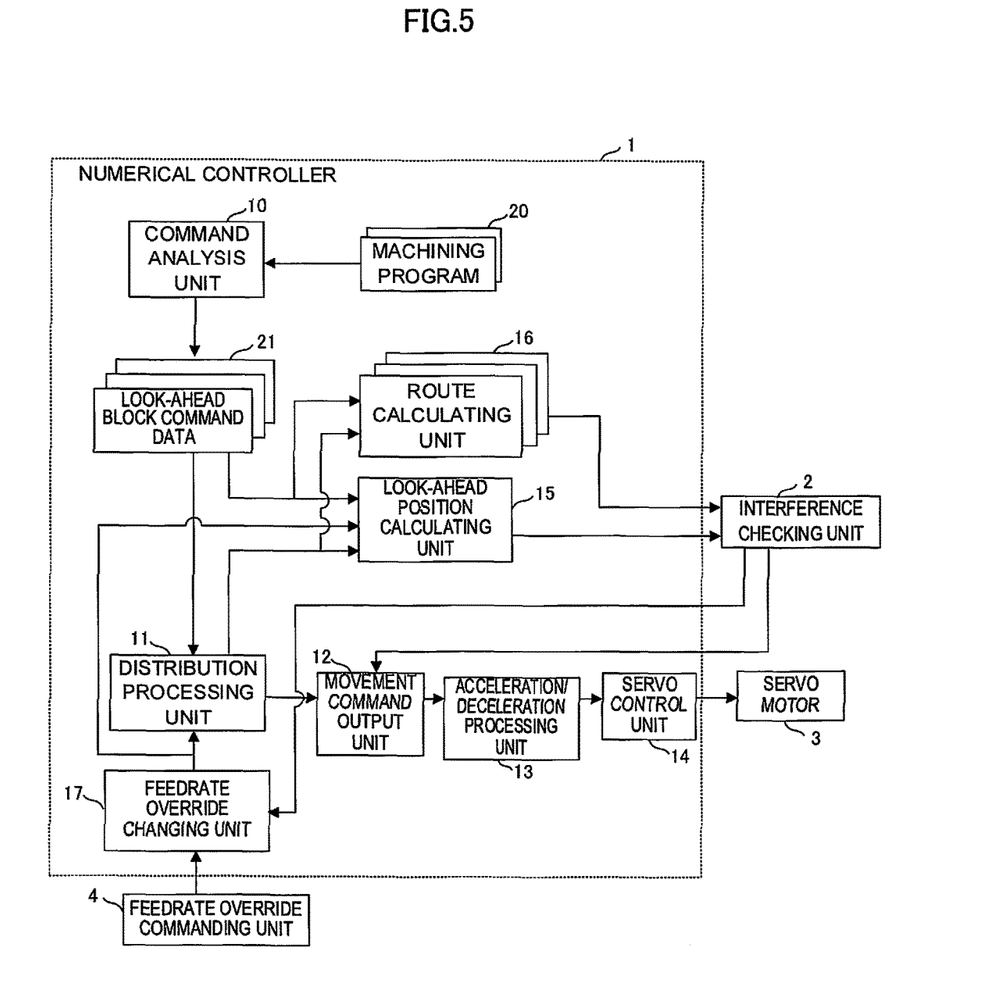
FIG. 5 is a functional block diagram of a numerical controller according to an embodiment of the present invention.

FIG. 5 is a functional block diagram of a numerical controller according to an embodiment of the present invention. A numerical controller 1 of the present invention includes a command analysis unit 10, a distribution processing unit 11, a movement command output unit 12, an acceleration/deceleration processing unit 13, a servo control unit 14, a look-ahead position calculating unit 15, a route calculating unit 16, and a feedrate override changing unit 17.

The command analysis unit 10 reads a command for each block from a machining program 20, converts the command to executable data to create look-ahead block command data 21, and stores the data in a work memory or the like (not illustrated).

The distribution processing unit 11 reads respective blocks of the look-ahead block command data 21, calculates a distributed movement amount commanded to the movable part of each axis (a servo motor of each axis) at each distribution cycle based on each axis movement amount and a feedrate commanded in the block and an override value (%) commanded by a feedrate override commanding unit 4, and adds the distributed movement amount to a current position register (not illustrated) to update a current coordinate position (hereinafter referred to as a current position).

Moreover, the distribution processing unit 11 outputs the calculated distributed movement amount to the acceleration/deceleration processing unit 13 via the movement command output unit 12. As described later, the movement command output unit 12 stops outputting the distributed movement amount in the movement command output from the distribution processing unit 11 to the acceleration/deceleration processing unit 13 when an axis stop command is input from an interference checking unit 2, and outputs the movement command to the acceleration/deceleration processing unit 13 unless the axis stop command is input from the interference checking unit 2.

The acceleration/deceleration processing unit 13 performs acceleration or deceleration in response to the movement command to output a movement command corresponding to the movement amount subjected to the acceleration or deceleration processing, to the servo control unit 14 that controls the servo motor 3. The servo control unit 14 performs feedback control on a position and a speed based on the movement command and the position and the speed from a position/speed detector attached to the servo motor 3 (or the movable part driven by the servo motor 3) and feedback control on a current based on the current from a current detector that detects a driving current to control the driving of the servo motor 3 with the aid of an amplifier. Although only one servo motor 3 is illustrated in FIG. 5, the same control is performed on the servo motors of respective axes (respective movable parts) of a machine tool, and the position and the speed of the respective movable parts are controlled.

The look-ahead position calculating unit 15 calculates a look-ahead position which is the position to which the movable part driven by the servo motor 3 moves from the current position after a look-ahead period elapses. The look-ahead position is calculated based on the current position of the movable part, the look-ahead period which is set or calculated, the look-ahead block command data 21, and the override value (%) input via the feedrate override commanding unit 4. The look-ahead position calculating unit 15 outputs the look-ahead period and the coordinate value of the look-ahead position to the interference checking unit 2 in order to perform interference check.

The look-ahead period used by the look-ahead position calculating unit 15 is set to a value obtained by adding a predetermined time allowance α to the value ($T_{P1}+T_{P2}+T_{P3}$) obtained by adding the time $T_{P1}$ required for the interference checking unit 2 to perform the interference check process, the time $T_{P2}$ required for communication between the look-ahead position calculating unit 15 and the interference checking unit 2, and the time $T_{P3}$ required for decelerating and stopping a moving movable part. In general, the time $T_{P2}$ required for communication between the look-ahead position calculating unit 15 and the interference checking unit 2 is a constant value which rarely varies when a system configuration is determined and can be obtained by measurement. Moreover, the time $T_{P3}$ required for decelerating and stopping the movable part is a constant value determined depending on the configuration of the acceleration/deceleration processing unit 13. On the other hand, the time $T_{P1}$ required for the interference checking unit 2 to perform the interference check process varies depending on an operation position of a plurality of movable parts. However, since the position of a movable part which is subjected to the present interference check is generally near the position of the movable part which has been subjected to the previous interference check, the time that has required for the interference checking unit 2 to perform the last interference check may be feedback to the look-ahead position calculating unit 15 and the time may be used as the time $T_{P1}$ required for the interference check.

The interference checking unit 2 having received the look-ahead period and the coordinate value of the look-ahead position from the look-ahead position calculating unit 15 stores a contour shape of a tool or a workpiece, a contour shape of a machine, and the like, checks whether or not the tool interferes with another object based on the positions of the respective movable part transmitted from the look-ahead position calculating unit 15, and outputs an axis stop command to the movement command output unit 12 based on the checking result. The interference checking unit 2 is configured as an information processing device such as a personal computer.

Since the details of the processing of the look-ahead position calculating unit 15 and the interference checking unit 2 is known in prior art documents such as Japanese Patent Application Laid-Open No. 2008-27376, mentioned above, the description thereof will not be provided.

The configuration of the numerical controller 1 is known in the prior art. In the present embodiment, the route calculating unit 16 and the feedrate override changing unit 17 are further provided in the numerical controller 1.

The route calculating unit 16 calculates a surplus look-ahead position which is the position to which the movable part driven by the servo motor 3 moves from the current position after a surplus look-ahead period elapses. The route calculating unit 16 is different from the look-ahead position calculating unit 15 in that, when the route calculating unit 16 calculates the look-ahead position of the movable part, the route calculating unit 16 outputs the coordinate value of the surplus look-ahead position when it is assumed that the movable part moves from the current position at a predetermined feedrate of which the upper limit is the maximum feedrate.

When the maximum value of the override value commandable by the feedrate override commanding unit 4 is 200%, for example, the route calculating unit 16 calculates the coordinate values of a plurality of surplus look-ahead positions when the movable part moved as if it were commanded with a plurality of predetermined override values (for example, three values of 200%, 170%, and 130%) of which the upper limit is the override value 200%, based on the movement amount and speed of the respective axes commanded in the block of the look-ahead block command data 21. The route calculating unit 16 causes the interference checking unit 2 to perform interference check based on the surplus look-ahead period and the calculated coordinate values of the respective surplus look-ahead positions and causes the feedrate override changing unit 17 described later to output a signal for limiting or modifying the change of the override value when it is detected by the interference check that an interference occurs.

The effect of the present invention is obtained when only the coordinate value of the surplus look-ahead position when an approximately maximum override value is commanded is calculated by the route calculating unit 16, and interference check is performed for the surplus look-ahead position only. However, in this case, the range of a route in which the occurrence of interference is detected may become too wide and the range of limiting the change of the override value may become too wide. Thus, when the range of the override values at which the occurrence of an interference is detected is limited by calculating the coordinate values of a plurality of surplus look-ahead positions based on the plurality of override values and performing interference check as described above, it is possible to limit the range of limiting the change of the override value and to use the function of the present invention more effectively.

A plurality of route calculating units 16 may be provided so that the respective route calculating units 16 calculate the coordinate values of surplus look-ahead positions based on override values. Alternatively, the coordinate values of a plurality of surplus look-ahead positions may be calculated by one route calculating unit 16.

Moreover, when the route calculating unit 16 causes the interference checking unit 2 to perform interference check, the route calculating unit 16 outputs information on a route commanded in the block of the look-ahead block command data 21 to the interference checking unit 2. The information on the route may be output as, for example, as described above with reference to FIG. 2, an end point of a first block at which the current position is located and information of a command based on a linear interpolation (cutting feed), and a center position of a circular arc of a second block, a look-ahead position and information of a command based on a circular interpolation. The interference checking unit 2 that has received the information on the route from the route calculating unit 16 can perform interference check more accurately by taking the information on the route into consideration when performing interference check based on the look-ahead period and the coordinate value of the look-ahead position transmitted from the route calculating unit 16.

In response to a command from the interference checking unit 2, the feedrate override changing unit 17 limits or modifies the change of the override value commanded by the feedrate override commanding unit 4. In a normal state, although the feedrate override changing unit 17 sets the override value commanded by the feedrate override commanding unit 4 as the override value output to the distribution processing unit 11 as it was, (1) when a signal for limiting or modifying the change of a predetermined override value is received from the interference checking unit 2, the feedrate override changing unit 17 inhibits the change of the override value by ignoring a command to change the override value to a predetermined override value or higher when a command to increase the override value is commanded by the feedrate override commanding unit 4; and (2) when a command to decrease the override value is commanded by the feedrate override commanding unit 4, the feedrate override changing unit 17 decreases the override value of a path subjected to the command by the same proportion as the commanded value.

As an example of a method of limiting the override value, when interference check was performed with a plurality of override values (for example, three values of 200%, 170%, and 130%), if an interference does not occur at a surplus look-ahead position corresponding to the override value of 170% and an interference occurs at a surplus look-ahead position corresponding to the override value of 200%, it may be inhibited to change the override value to be higher than 170%. Another method of limiting the change may be used.

Figure 6:
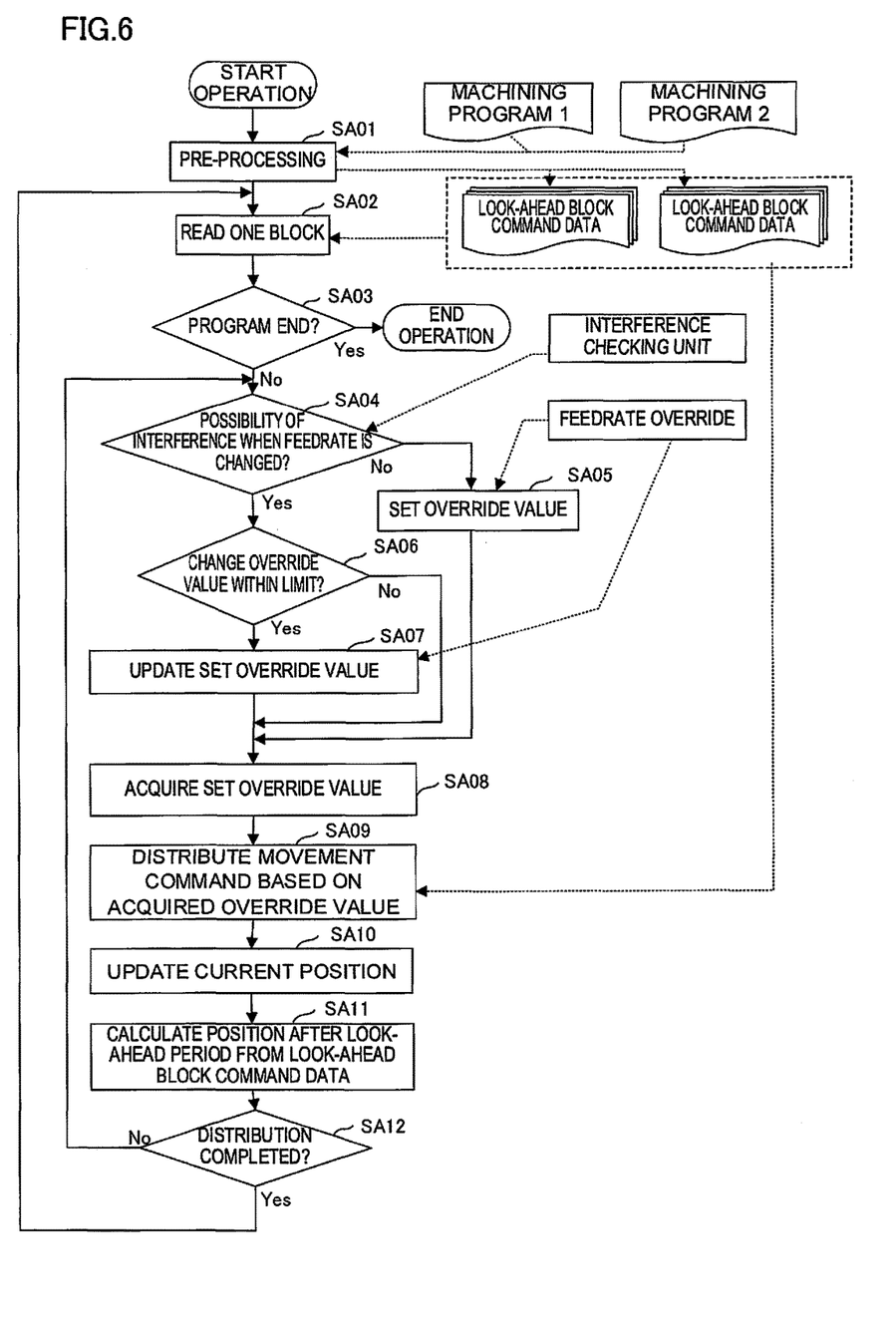
FIG. 6 is a flowchart of an override limiting process executed on the numerical controller illustrated in FIG. 5.

FIG. 6 is a flowchart of an override limiting process executed on the numerical controller according to the embodiment of the present invention. In the flowchart of FIG. 6, dotted line arrows indicate the flow of data or signals.

[Step SA01]

The command analysis unit 10 reads a command for each block from a machining program 20, converts the command to executable data to create look-ahead block command data 21, and stores the data in a work memory or the like (not illustrated).

[Step SA02]

The distribution processing unit 11 reads respective blocks from the look-ahead block command data 21.

[Step SA03]

It is determined whether or not the program has ended. This process ends when the program has ended, whereas the process proceeds to step SA04 when the program has not ended.

[Step SA04]

The feedrate override changing unit 17 determines whether or not a signal for limiting or modifying the change of the override value is received from the interference checking unit 2. The process proceeds to step SA06 when the signal for limiting or modifying the change of the override value is received from the interference checking unit 2, and otherwise, the process proceeds to step SA05.

[Step SA05]

The feedrate override changing unit 17 determines that the change of the override value is not limited and sets the value commanded by the feedrate override commanding unit 4 as the override value.

[Step SA06]

The feedrate override changing unit 17 determines whether or not the value commanded by the feedrate override commanding unit 4 corresponds to any one of decreasing the override value and increasing the override value within the range of predetermined override values in which the change is limited. The process proceeds to step SA07 when the value corresponds to any one of the two cases, and otherwise, the process proceeds to step SA08 (when the override value is to be increased to be higher than the limited range of predetermined override values).

[Step SA07]

When the commanded value involves decreasing the override value, the feedrate override changing unit 17 updates the set override value by decreasing the override value by the same proportion as the commanded value. When the commanded value involves increasing the override value within the limited range of predetermined override values of which the change is limited, the feedrate override changing unit 17 sets the commanded value as the override value.

[Step SA08]

The distribution processing unit 11 acquires the override value set by the feedrate override changing unit 17.

[Step SA09]

The distribution processing unit 11 calculates a distributed movement amount commanded to a movable part of each axis (a servo motor of each axis) at each distribution cycle based on the axis movement amount and a speed which are commanded in the block read in step SA02 and the override value which is acquired in step SA08 and outputs the calculated distributed movement amount to the movement command output unit 12.

[Step SA10]

The distribution processing unit 11 adds the distributed movement amount calculated in step SA09 to the current position register to update the current coordinate position.

[Step SA11]

The route calculating unit 16 calculates the coordinate values of a plurality of surplus look-ahead positions at a plurality of override values of which the upper limit is the maximum value of the override value, based on the data read from the look-ahead block command data 21, and causes the interference checking unit 2 to perform interference check based on the calculation result.

[Step SA12]

It is determined whether or not the process of distributing the read blocks has been completed. The process returns to step SA02 when the distribution process has been completed whereas the process returns to step SA04 when the distribution process has not been completed.

While the embodiment of the present invention has been described, the present invention can be implemented in various forms by adding appropriate changes without being limited to the example of the above-described embodiment.

For example, in the embodiment, although it is described that the plurality of override values used when the route calculating unit 16 calculates the coordinate values are set in advance, the override values may be set at the time of shipping the numerical controller and may be set before an operator or the like starts an operation. Moreover, the override values may be dynamically set and changed during machining by a program or the like. Further, the number of override values subjected to interference check may be changed. By doing so, it is possible to perform interference check flexibly according to a processing state.

The invention claimed is:

1. A numerical controller that controls driving of a movable part of a machine based on a command from a program, and that comprises an interference checking unit that checks an interference between the movable part and another object, the numerical controller being configured to decelerate and stop movement of the movable part when an interference is predicted by the interference checking unit, the numerical controller comprising:
a feedrate override commanding unit configured to command an override value of a feedrate of the movable part;
a command analysis unit configured to look ahead and analyze a program to generate look-ahead block command data; and
a route calculating unit configured to
calculate a surplus look-ahead period which is a period obtained by adding a surplus period to a look-ahead period which is a period required for the interference checking unit to predict an interference to safely decelerate and stop the movement of the movable part,
calculate, based on the look-ahead block command data, at least one surplus look-ahead position of the movable part after the surplus look-ahead period elapses, the surplus look-ahead period corresponding to at least one set override value including at least an approximately maximum override value commandable by the feedrate override commanding unit, and
output a plurality of surplus look-ahead positions to the interference checking unit, wherein
the interference checking unit performs interference check based on the plurality of surplus look-ahead positions.

2. The numerical controller according to claim 1, wherein the route calculating unit is configured to output a command route commanded by the look-ahead block command data to the interference checking unit as well as the plurality of surplus look-ahead positions, and
the interference checking unit is configured to perform interference check based on the plurality of surplus look-ahead positions and the command route.

3. The numerical controller according to claim 1, further comprising:
a feedrate override changing unit that limits the change of an override value according to a command from the interference checking unit, wherein
the interference checking unit is configured to perform interference check based on the surplus look-ahead positions and cause the feedrate override changing unit to limit the change of the override value when an interference is detected as the result of the interference check.

* * * * *